UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOW DYE.

972,951.     Specification of Letters Patent.     Patented Oct. 18, 1910.

No Drawing.     Application filed January 12, 1910. Serial No. 537,730.

*To all whom it may concern:*

Be it known that I, PAUL VOLKMANN, doctor of philosophy, chemist, citizen of the German Empire, residing at Elberfeld, Germany, have invented new and useful Improvements in Yellow Dyes, of which the following is a specification.

My invention relates to the manufacture of a new yellow azo dye by condensing a mixture of phenylhydrazin-ortho- and para-sulfonic acid with dioxytartaric acid.

It is characterized by its good fastness to light and its valuable greenish-yellow shade.

To illustrate my process, I can proceed as follows, the parts being by weight:—150.6 parts of an equimolecular mixture of phenyl-hydrazin-ortho- and para-sulfonic acid are stirred up with 1000 parts of water and 60 parts of sulfuric acid (60° Bé.) To this mixture 106 parts of the sodium salt of dioxytartaric acid are added. The mixture is stirred for 1 hour and is then boiled for 2 hours. The dye is salted out, filtered off, mixed with sodium carbonate to make the neutral sodium salt and dried.

It is in the shape of its sodium salt a yellow powder soluble in concentrated sulfuric acid with a yellow color. Upon reduction with stannous chlorid and hydrochloric acid the dye is decomposed, anilin-sulfonic acid and 1-sulfophenyl-3-carboxy-4-amino-5-pyrazolone is obtained. It produces on wool bright greenish-yellow level shades, fast to light.

I claim:—

The herein described new coloring matter obtainable from phenylhydrazin-ortho- and para-sulfonic acid and dioxytartaric acid, which is in dry state in the shape of its sodium salt a yellow powder soluble in concentrated sulfuric acid with a yellow color; yielding upon reduction with stannous chlorid and hydrochloric acid anilin-sulfonic acid and 1-sulfophenyl-3-carboxy-4-amino-5-pyrazolone; and dyeing wool bright greenish-yellow shades, substantially as described.

In testimony whereof I have hereunto set my hand in the presence of two subscribing witnesses.

PAUL VOLKMANN. [L. S.]

Witnesses:
   OTTO KÖNIG,
   CHAS. J. WRIGHT.